United States Patent Office 3,064,497
Patented Nov. 20, 1962

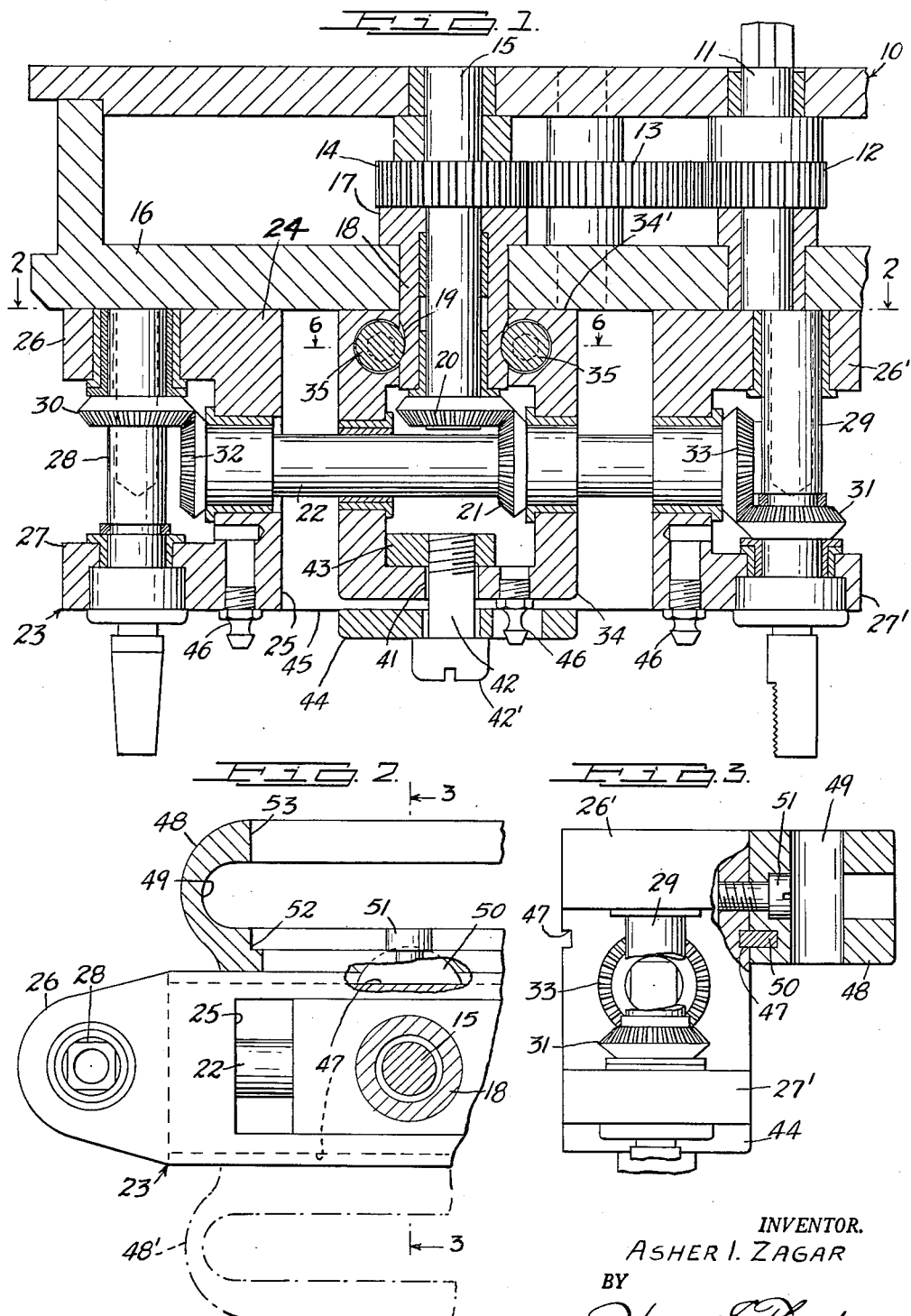

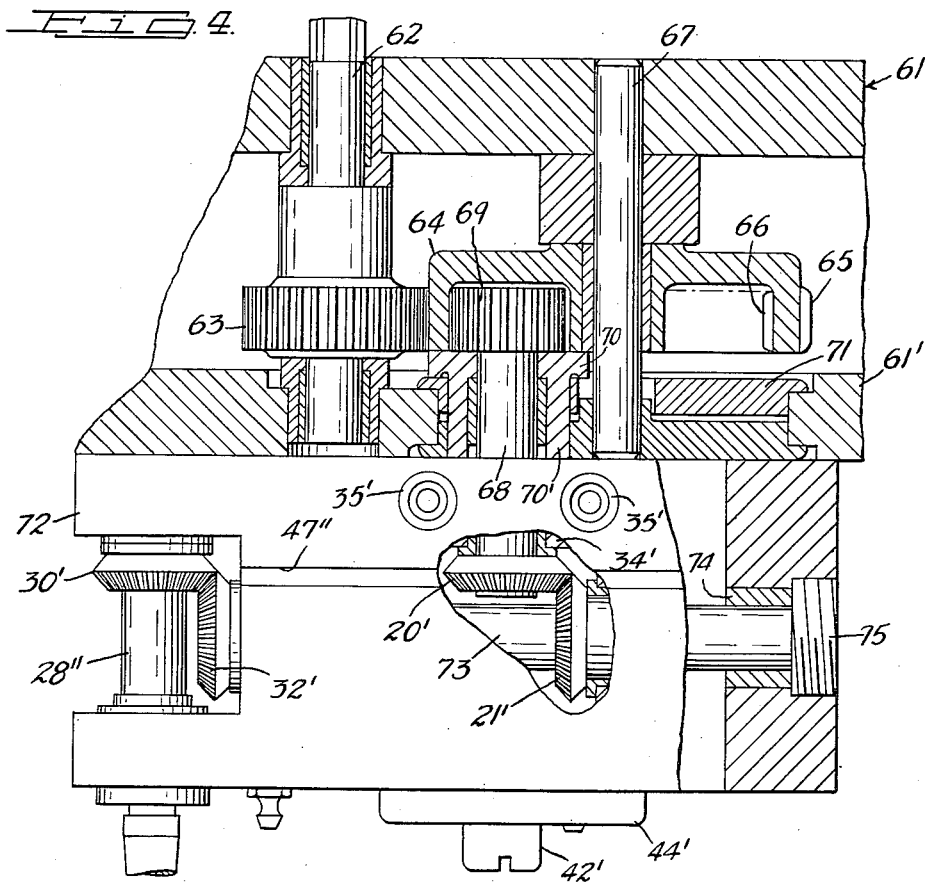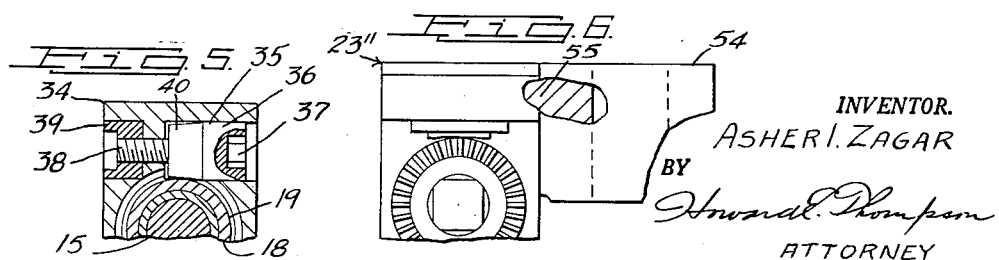

3,064,497
EXTENSIBLE TOOL SUPPORTING ARM FOR DRILL AND TAP DRIVE HEADS
Asher I. Zagar, Brooklyn, N.Y., assignor to Eitco Tool & Machine Co., Inc., Brooklyn, N.Y., a corporation of New York
Filed Aug. 24, 1960, Ser. No. 51,680
6 Claims. (Cl. 74—665)

This invention relates generally to drilling and tapping machines employing multiple heads for the simultaneous operation of a number of tools, such as drills or taps, adjusted to predetermined positions in performance of a plurality of drilling and/or tapping operations at predetermined designated portions of a workpiece. More particularly, the present invention deals with the use of what I term an extension arm employed in conjunction with multiple heads of the type and kind under consideration whereby, through one or two different adjustments of the arm, a greater range of positioning of tools on a workpiece is made possible, thereby enlarging upon or amplifying the uses of multiple heads of the type and kind under consideration.

Still more particularly, the invention deals with a structure of the character described having means for retaining the arm in predetermined position of adjustment.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a sectional view through one form of arm which I employ mounted in connection with a multiple drive head, part of the head being broken away and parts of the construction being shown in elevation.

FIG. 2 is a sectional view on the line 2—2 of FIG. 1 showing only part of the construction and illustrating a modified adaptation of the arm partly in section and part in dot-dash lines, with part of the construction broken away.

FIG. 3 is an end view of the arm as shown in FIGS. 1 and 2, with part of the construction shown in section on the line 3—3 of FIG. 2 and with parts of the construction broken away.

FIG. 4 is a view, generally similar to FIG. 1, showing a modified form of multiple head in section and illustrating a modified form of arm partly in elevation and partly in section and, further, with part of the construction broken away.

FIG. 5 is a section detail view partially on the line 6—6 of FIG. 1, with part of the construction shown in elevation; and FIG. 6 is a partial view, generally similar to the showing in FIG. 3, illustrating a modification.

In illustrating one adaptation and use of my invention, I have shown in FIG. 1 of the drawing a multiple head 10, generally of the type and kind disclosed in Patent Number 2,589,485 granted March 18, 1952. At 11 is shown the drive shaft of the head, on which is a gear 12 meshing with one of a number of idlers 13 spaced circumferentially around the shaft 11, the idler 13 meshing with a gear 14 on a driven shaft 15.

The shaft 15 projects through the bottom wall 16 of the head 10 and is arranged in a suitable bearing 17, the latter having a projecting sleeve portion 18 with a circumferential groove 19 therein. Suitably fixed to the inner end of the shaft 15 is a bevelled gear 20 meshing with a corresponding gear 21 suitable keyed to and adjustable longitudinally of the shaft 22 of an extension arm 23. The arm 23 has an elongated body portion 24, with an aperture 25 extending longitudinally of the body portion, the ends of the body portion terminating in forked upper and lower bearings 26, 27 at one end, 26' and 27' at the opposed end. In these bearings are mounted tool spindles 28 and 29, respectively, with bevelled gears 30 and 31 suitably fixed thereto, the latter operatively engaging similar gears 32 and 33 fixed to the ends of the shaft 22. It will appear that the gears 32 and 33 have suitable bearing supports in the body portion 24 of the arm 23. The gear 21 and the shaft 22 have suitable bearing supports in opposed walls of an adjustable hollow block 34, into the upper end of which the sleeve 18 extends. Mounted in opposed sides of the upper portion of the block 34 are two adjustable coupling devices 35 and, as both devices are of the same construction, the brief description of one will apply to both.

One of the devices 35 is shown in detail in FIG. 5 of the drawing. Each device 35 comprises an adjustable key member 36, having a socket end 37 opening through the block 34. At the other end of the member 36 is a screw threaded spindle 38 operatively engaging a clamp nut 39 at the other side of the block. The inner end portion of the member 36 has a bevelled portion 40 operatively engaging the groove 19 of the sleeve 18 in supporting the upper surface 34' of the block in engagement with the lower surface of the bottom wall 16 of the head.

The bottom wall of the block 34 has an aperture 41, in which is arranged a screw 42 in threaded engagement with an inner clamp plate 43, the head 42' of the screw operatively engaging another clamp plate 44 which bears upon the lower surface 45 of the arm in securely fixing the adjusted position of the arm with respect to the shaft 15 of the head 10. This adjustment varies the radial spacing of the tool spindles 28 and 29 with respect to the axis of the shaft 15 and also the circumferential positioning of these spindles on the surface of the head.

At 46 in the accompanying drawing are diagrammatically illustrated grease fittings for introducing lubrication to the gears and shafts of the arm, it being understood, in this connection, that suitable enclosure casings will be employed at ends of the arm, but these casings have been eliminated to simplify the present illustration.

Considering FIG. 2 of the drawing, it will appear that the side walls of the arm 23 preferably employ longitudinal grooves 47. The purpose of these grooves is to adapt the adjustable mounting of supporting brackets on either side of the arm. From this standpoint, one of these brackets is indicated partially in section at 48 and the secondary use of such a bracket is indicated in dot-dash lines at 48'. The bracket 48 has an elongated aperture 49 opening through upper and lower surfaces thereof to adapt the same for mounting in connection with a suitable support.

It will be apparent that, in addition to simply adjusting the position of the bracket upon a support, the arm itself is adjustable in the bracket, thus producing a still wider range of positioning of the tool spindle and this is accomplished by providing in the bracket a Woodruff key 50 operating in the elongated keyway 47 and also a clamp screw 51 operating in an elongated recess 52 in the bracket, the opposed wall of the bracket having a corresponding recess 53 giving access to the screw for fixing adjustment of the parts one with respect to the other in any position of adjustment throughout the major portion of the length of the bracket, as will be apparent. The arrangement of 50 and 51 is clearly illustrated in FIG. 3 of the drawing.

At this time, it is well to point out that, in some instances, a special form of arm 23 can be constructed as, for example, the arm 23″ of FIG. 6, where a bracket portion 54, generally similar to the bracket 48, is employed but formed integral with one side of the arm, as indicated by the sectioning at 55. In this form of construction, it will be apparent that the arm 23″ maintains a definite relationship on the bracket 54 and would not have the adjustment as provided through the medium of 50 and 51 as in FIGS. 2 and 3 of the drawing.

Turning now to the showing in FIG. 4 of the drawing, at 61 I have indicated, in part, an adjustable multiple head, generally of the type and kind disclosed in Patent Number 2,551,659 granted May 8, 1951. In heads of this type and kind, the drive shaft 62 of the head has a gear 63 which meshes with one of a number of circumferentially spaced internal, external gears 64, in other words, the external teeth 65 thereof, one of which is clearly indicated at the right of FIG. 4, and in said position, one of the teeth of the internal gear is indicated at 66. The gear 64 is mounted on a shaft 67 suitably supported in the head 61. Rotatably adjustable about the shaft 67 is a driven shaft 68 having a pinion 69 meshing with the internal gear 66. The shaft 68 has a suitable bearing support, as at 70, in a pair of discs 71 rotatably adjustable in the bottom wall 61′ of the head 61.

Coupled with the head 61 is a modified form of arm 72 having two coupling devices 35′, similar to the devices 35, for engaging the sleeve 70′ of the bearing 70, this sleeve being similar to the sleeve 18. At the inner end of the shaft 68 is a bevelled gear 20′, similar to the gear 20, meshing with a companion gear 21′ on a shaft 73. At one end of the shaft 73 is a gear 32′, similar to the gear 32 and meshing with a gear 30′ on the tool spindle 28″, similar to the spindle 28.

Within the arm 72 is an adjustable block, similar to the block 34, and indicated partly in section at 34′ and at 44′ is shown a plate, similar to the plate 44, and at 42′ is shown a screw, similar to the screw 42. In other words, with the structure shown in FIG. 4, the arm 72 is adjustable with respect to the shaft 68, similar to the adjustment of the arm 23. A further difference in the arm 72 resides in the fact that it has a single tool supporting spindle, rather than the tool spindles as employed on the arm 23. Further, the shaft 73 is arranged in a bearing 74 at the other end of the arm, a nut 75 being employed to retain the position of the shaft 73 in the arm. It will also be apparent that the arm 72 is grooved on its opposed side walls, similar to the grooves 47, 47′, and one of these grooves is indicated, in part, at 47″ in FIG. 4 of the drawing, thus adapting the arm 72 for mounting on one of the brackets, as illustrated at 48 in FIG. 2 of the drawing.

It will be apparent that, with the several forms of construction shown, the arms can also utilize the bracket portions for an adjustable mounting of the arm in connection with a support.

Having fully described my invention, what I claim as new and desire to secure by Letters Patent is:

1. A multiple head employing a plurality of driven shafts, an elongated arm, a driven shaft of said head extending into said arm, said shaft having a bearing sleeve in said arm, a shaft mounted within and extending longitudinally of said arm and rotated by the driven shaft of said head extending into said arm, at least one end of said arm being forked, a tool spindle having spaced bearing supports in the forked end of said arm, interengaging bevelled gears on the second named shaft and said tool spindle within the fork of said arm, means adjustably coupled with said arm providing radial adjustment of the tool spindle with respect to a drive shaft of said head, and means operatively engaging said bearing sleeve providing circumferential adjustment of said tool spindle.

2. A structure as defined in claim 1, wherein the first named means includes a block arranged in said arm and around said bearing sleeve.

3. A structure as defined in claim 1, wherein said arm includes means at opposed sides thereof for adjustably supporting a bracket on either side of said arm.

4. A structure as defined in claim 1, wherein a bracket extends longitudinally of one side of said arm, said bracket having an elongated aperture therein, and means operating in said aperture and engaging said arm for fixing the arm in adjusted positions on said bracket.

5. An extensible tool supporting elongated arm of the character described, said arm having a forked end, a tool spindle mounted in spaced bearings in the fork of said arm, a driven shaft having a sleeve bearing support in said arm and spaced with respect to said spindle, a block adjustably clamped in said arm, an elongated shaft mounted within and extending longitudinally of the arm and having bearing supports in the arm and said block, pairs of bevelled gears providing a drive connection between the driven shaft and said elongated shaft and the elongated shaft and said tool spindle, the latter pair of gears being disposed within the fork of said arm, and means adjustably mounted in said block and operatively engaging said sleeve bearing in fixing adjusted positions of said tool spindle circumferentially with respect to said driven shaft.

6. A tool supporting arm as defined in claim 5, wherein the arm includes at one side thereof an elongated apertured bracket, and means adjustably mounting the arm in connection with said bracket.

References Cited in the file of this patent

UNITED STATES PATENTS

| | | |
|---|---|---|
| 1,058,045 | Fox | Apr. 8, 1913 |
| 1,352,125 | Harrah | Sept. 2, 1920 |
| 2,068,594 | Buhr | Jan. 19, 1937 |
| 2,349,240 | Aiman | May 23, 1944 |
| 2,430,522 | Melniczak | Nov. 11, 1947 |
| 2,551,659 | Emrick | May 8, 1951 |
| 2,727,402 | Thoresen | Dec. 20, 1955 |
| 2,884,818 | Speckin et al. | May 5, 1959 |